May 22, 1951 J. A. CROSS 2,554,138
CONCENTRATING APPARATUS
Filed Sept. 14, 1944 6 Sheets-Sheet 1

Fig.1.

Inventor:
Joseph A. Cross
By Thomas H. Ferguson
Attorney

Fig. 2.

Inventor:
Joseph A. Cross
By: Thomas H. Ferguson
Attorney

May 22, 1951 J. A. CROSS 2,554,138
CONCENTRATING APPARATUS
Filed Sept. 14, 1944 6 Sheets-Sheet 3

Inventor:
Joseph A. Cross
By Thomas H. Ferguson
Attorney.

May 22, 1951 — J. A. CROSS — 2,554,138
CONCENTRATING APPARATUS
Filed Sept. 14, 1944 — 6 Sheets-Sheet 4

Inventor:
Joseph A. Cross
By: Thomas H. Ferguson
Attorney

May 22, 1951 J. A. CROSS 2,554,138
CONCENTRATING APPARATUS
Filed Sept. 14, 1944 6 Sheets-Sheet 6

Inventor:
Joseph A. Cross
By: Thomas H. Ferguson
Attorney

Patented May 22, 1951

2,554,138

UNITED STATES PATENT OFFICE 2,554,138

CONCENTRATING APPARATUS

Joseph A. Cross, Westerville, Ohio, assignor to Mojonnier Bros. Co., a corporation of Illinois Application September 14, 1944, Serial No. 554,015

7 Claims. (Cl. 159—27)

1

The present invention relates to concentrating apparatus for use in preparing various kinds of edible foods such as the various condensed milk products, concentrated citrus and other fruit juices, soups and the like.

One object of the invention is to provide novel apparatus of the character mentioned, which shall be capable of long periods of continuous operation. In this connection it is also desirable that the apparatus be useful in handling liquids of great viscosity and to handle all the products, for which it is designed, with rapidity.

Another object, looking to the production of sanitary apparatus, includes the provision of a removable cover on the food side of the heat exchanger, which may be readily secured in place for operation, and as readily removed for cleaning. The use of an inflatable tubular gasket contributes to this end.

Another object is to provide apparatus in which the outlet from the separating chamber may be connected with the inlet manifold of the heat exchanger for recirculation therethrough. In this way the product, which may not have been sufficiently concentrated by a single passage through the equipment, may be recirculated until the desired degree of concentration is obtained.

Another object is to provide novel apparatus of the class mentioned in which the heating and condensing elements are, for the most part, quite separate. Thus, they may be easily inspected and cleaned. All of this contributes to good sanitation.

Another object is to provide great flexibility of design as between the heating surfaces and the collecting or separating chamber. This is made possible by keeping these two elements apart. Thus, a very large heating surface can be provided with a relatively small condensing means, so the product will be in transit a very short time, and by its rapid travel and is short time in contact with the heat, the natural characteristics of the product remain more nearly like the original.

Another object is to provide apparatus of the class described having heating elements arranged for progressive evaporation of the liquid.

These and various other objects and advantages will be more fully set forth in the following description taken in connection with the accompanying drawings, which illustrate a preferred embodiment of the invention. The scope of the invention will be particularly pointed out in the appended claims.

In said drawings—

2

Throughout these views, like characters refer to like parts.

Figure 1:
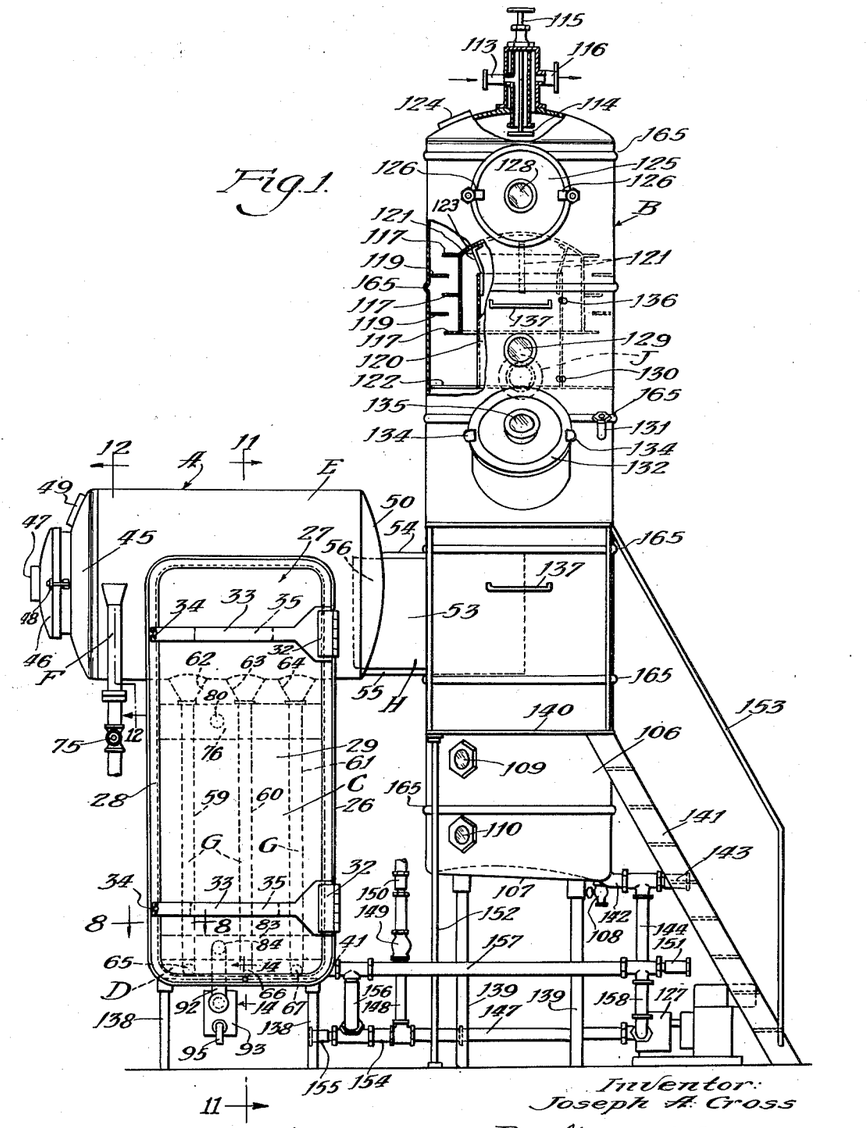
Fig. 1 is a side elevation of apparatus constructed and arranged in accordance with the present invention.

Referring to said drawings, A designates the heat exchanger portion of the apparatus, and B the condensing and separating portion. The latter portion consists of a vacuum chamber having means for condensing the vapors in the top and a space for collecting the liquids in the bottom. The heat exchanger portion A comprises vertical tubular elements C which extend between an intake manifold D and a relatively large horizontal cylindrical chamber E which serves as the outlet manifold. The liquid to be treated is fed through a pipe F into the outlet manifold in a direction preferably parallel to that taken by the heated liquid discharged from the upper ends of the tubular elements C. The liquid fed through the passage F strikes the cylindrical wall of the chamber E and rotates in a counterclockwise direction as viewed in Fig. 11. It passes down through an outlet passage G, sometimes called a "downcomer," and from that passage is fed into the lower manifold D. In this way the liquid travels around within the chamber E and down through the downcomers G, of which there are in this instance three, and into the lower portion of the heating elements, which heat the liquid and cause it to rise and enter the same chamber E with considerable force, also with a rotary counterclockwise direction, as viewed in Fig. 11. The chamber E is connected by a passage H with the lower part of the chamber B. In chamber E as the heated liquid is rotated, the heavier particles tend to move to the periphery, and the lighter particles to the center. From this point they pass through the passage H into the condensing and separating chamber B. The chamber B is provided with a suction connection J so that the entire chamber, both upper and lower portions, is subject to vacuum. This vacuum acts upon the rising vapor to withdraw it through the upper portion of the chamber B and allows the more or less concentrated liquid which is heavier to collect in the lower portion of the same chamber B. The vacuum in the chamber B also vacuumizes the chamber E which acts as the upper outlet manifold E. The liquid in its rotation around within the chamber E is divided by partitions K and deflectors L. The force given to the liquid as it is heated and discharged by the heating elements C, when coupled with the suction applied by the vacuum at the right end of chamber E, as viewed in Fig. 1, separates the lighter particles from the heavier and allows the latter to pass progressively from section to section, through suitable holes in the barrier K each time being recycled to its section by its downcomer. This action may be repeated as many times as may seem desirable by multiplying the downcomers G and barriers K. In the present instance, there are three downcomers G and three sets of partitions K and deflectors L. Thus there are three evaporator units. In an embodiment actually tried out, with three downcomers and other parts as shown, the effect of the evaporation per square foot was 40 pounds per hour in the first or left-hand section, as viewed in Fig. 9, 30 pounds per hour in the second section and 20 pounds per hour in the third.

The chamber B may be of the ordinary vacuum pan type of construction, but not having the heating coils located within the chamber B. It however receives its supply of heated liquid in a tangential direction over a considerable portion of its cylindrical wall, as will be explained later. In the present instance, the vapors are condensed by a stream of water, as usual and as we shall also see later.

With this general view of the apparatus and its way of acting, we may now proceed to a detailed consideration of the same.

Figures 7, 8:
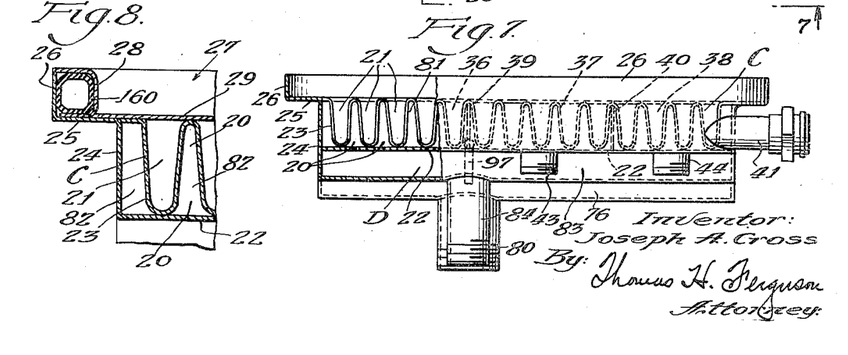
Fig. 7 is a bottom plan view of the heating element, a portion being shown in section to indicate more clearly the tubular arrangement, the section being taken on a plane indicated by the line 7—7 of Fig. 5.
Fig. 8 is a transverse section taken through a portion of the heating element with the closure in place and illustrating the way in which the expansible gasket acts, the plane of section being indicated by the line 8—8 of Fig. 1.

The heat exchanger elements C (shown generally in the drawings but more particularly in Figs. 5 to 8, inclusive) are provided in the specific instance by bending a sheet of metal back and forth in corrugations as illustrated, to provide a number of tubes 20 for the heating medium and a number of similar tubes 21 for conveying the liquid to be treated. The plate 22 cooperates with the bent sheet 23 to complete the tubes 20. The plate 22 is provided at its ends with flanges 24 which in turn are extended outward at 25 and are provided with a terminal flange 26. This box-like structure receives the closure 27 which, in the present instance (see Figs. 8, 9, 10, etc.), takes the form of a door provided with a peripheral channel 28, which door with its channel is adapted to fit within the flange 26. The inner wall of the door is provided with a plate 29, which also fits against the bent sheet 23 to form the tubes 21 which constitute tubes for carrying the liquid to be treated, or other liquid food. It will be seen that the tubes 20 are permanent and, when once fabricated, cannot be opened up. On the contrary, the tubes 21, which are closed with the plate 29, upon the cover 27, may have one side or wall placed, or removed, according to whether the door is in closed or open position. Thus, the tubes 20 and 21 constitute heating and treating passages, the latter of which discharge tangentially into the upper manifold chamber E. When the food carrying tubes 21, made up of the corrugated plate 23 and the closing plate 29, are to be cleaned, it is only necessary to remove the plate 29. This is done by swinging back the cover 27. Then all the walls of the tubes 21 may be easily cleaned.

The covering door 27 (see Fig. 1 etc.) is provided with a pair of hinges 32 by which it is swung from open to closed position, or vice versa. The hinge member 33 in each case has at its end a slot into which fits a swing bolt 34 carrying a thumb nut 34a. These parts are shown in detail in Fig. 13 and it will be obvious how the same may be operated. Behind the hinge members 33, reinforcing blocks 35 may be secured to the member 33 or the plate 29 or both. Likewise, any number of hinges may be employed according to the judgment of the designer.

In lieu of hinges 32, the closure may be modified so as to seat it the same as any cover provided with swing bolts 34. Thus, each end of the transverse member 33 may be slotted and swing bolts 34 used. Such alteration will occur to worker in this art in the course of their calling.

Figure 5:
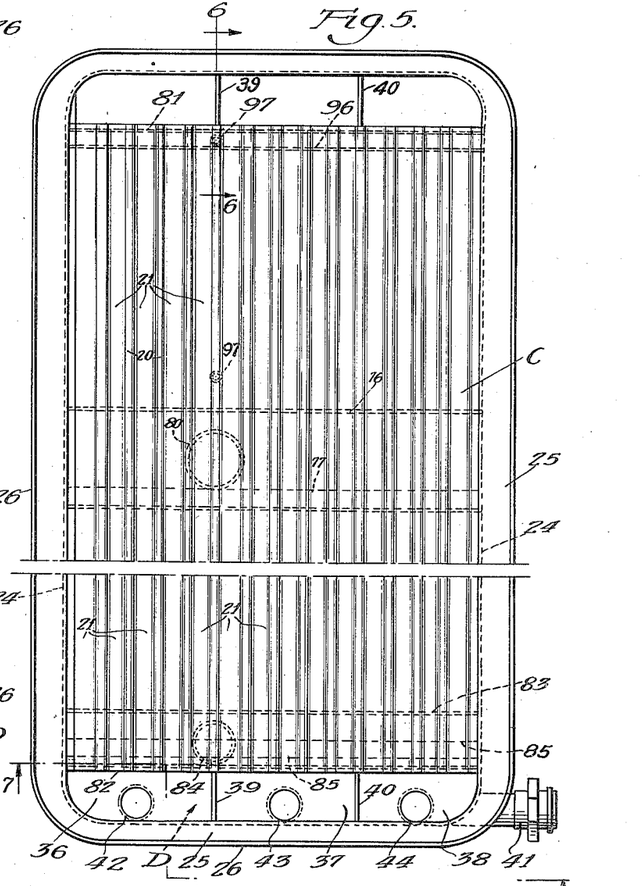
Fig. 5 is a face view of the heating element employed in the apparatus.
Figure 6:
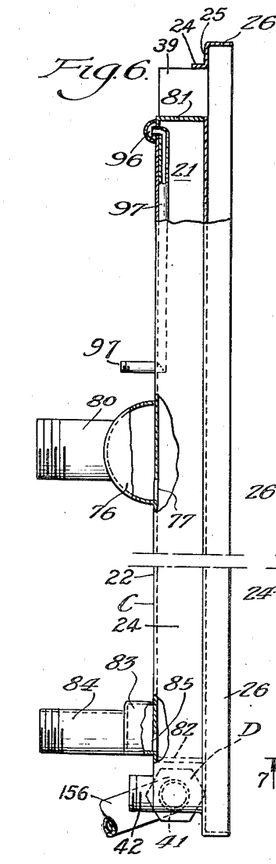
Fig. 6 is a side elevation of the heating element, the upper portion being shown in vertical section taken on a plane indicated by the line 6—6 of Fig. 5 and other portions being broken away to show more clearly the connections for the heat exchange medium.

The tubes 21 open into three intake sections or chambers 36, 37, 38 (see Fig. 5), between which are located the partitions 39 and 40. The partitions 39 extend through the entire height of the tube chest, as shown in Fig. 5, hence provide not only the three intake chambers 36, 37 and 38 but three corresponding outlet chambers for the liquid product as it emerges from the upper ends of the tubes 21 into the vapor separator E. Thus, liquid within the sections cannot be passed from one sectional chamber to the next without first going through the tubes 21. These sectional chambers are at the inlet ends of the tubes and constitute the inlet manifold D of the heater. Section 38 is provided with an external connection 41 for providing a recirculating path, as will be noted hereinafter. Suitable nipples 42, 43, 44, provide for connecting the downcomers G. This provides for the incoming liquid and comprises the description of the inlet manifold.

The outlet manifold (see Figs. 9, 10, for details) takes the form of a relatively large horizontal cylindrical chamber E which is closed at one end by a dish-shaped wall 45 having a manhole 46 and a glass covered peephole 47. For securing the manhole 46 in place, any suitable retaining means 48 may be employed such as swing bolts provided with suitable thumb nuts. An opening 49 is also provided for the insertion of a light to view the interior of the chamber during operation. The opposite end of the chamber is partially closed by a similar dish-shaped end wall 50 which is provided with a vertical opening 51 which constitutes an outlet opening for the chamber or upper manifold E.

It will be noted that this outlet manifold E projects outward from one side of the upright chamber B and has one end open so as to place its interior in communication with the interior of said chamber. As it is built in with the other elements of the heat exchanger, it makes the latter very accessible and easy to clean. It also provides for ease in manufacture. The heat exchanger may be made almost any size, quite irrespective of the size of the chamber B.

Figure 4:
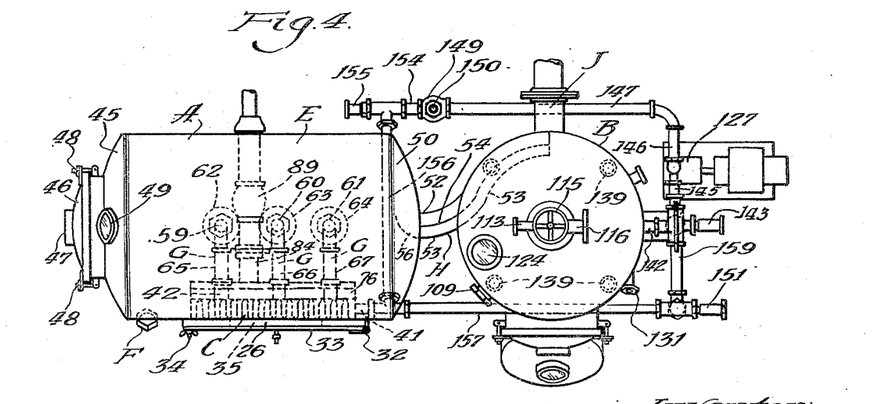
Fig. 4 is a plan view of the apparatus.

The connecting passage H (see Figs. 9, 10, etc.), which connects the horizontal chamber E and the lower portion of the upright chamber B, is provided by a duct extending from the opening 51 to and into the chamber B and comprising side walls 52 and 53, a top 54 and a bottom 55. The latter are upwardly and downwardly crowned so as to resist any tendency to buckle. The bottom 55 extends only between the chamber A and B. The sides and top extend within the chamber B, as clearly shown in Fig. 4. Therefore, the contents of the passage are discharged in a tangential direction into chamber B. The wall 53 has an extension 56 which is curved as shown in Fig. 10, and catches the liquid as it comes around within the chamber E to direct it out along the curved path formed by the walls 52, 53, extending to a point well on in the chamber B, as clearly shown in Fig. 4, the side wall 52 merging into the cylindrical wall of the chamber B. The opening 51, with which the passage H cooperates, extends upward from the bottom of the passage, as clearly illustrated, and is relatively narrow. The extension 56, which lies at the entrance to the discharge passage, is in fact a deflector which extends into the manifold E in a direction to guide the liquid or fluid being treated into the discharge passage. The greatest dimension of the deflector 56 is vertical, hence it is called a vertical deflector.

The connection between the outlet manifold E and the intake manifold D, designated generally as G (see Figs. 1, 9, 10, etc.), comprises three downcomer tubes or pipes 59, 60, 61, which lead from funnel-shaped openings 62, 63, 64, in the bottom of the chamber E, down to transverse pipes 65, 66, 67, which are respectively connected at their forward ends with the nipples 42, 43, 44 of the sections 36, 37, 38 of the intake manifold D. Thus the downcomers G convey the liquid from the outlet manifold E to the inlet manifold D, section by section. In other words, the upper manifold E has outlet passages which lead from openings in its bottom to the lower manifold D where the conveyed liquid begins its upward climb through the treating tubes 21 under the action of the parallel heating tubes 20, all as indicated by the arrows in Fig. 11.

The intake pipe F (see Figs. 9, 10, 12, etc.), through which the liquid to be treated is supplied to the horizontal chamber E, lies preferably parallel to the elements of the heat exchanger so that, upon delivery of its contents to the interior of the chamber, the same may be carried around the interior of the cylindrical wall in the same direction as the heated liquid that is discharged from the upper ends of the heat exchanger. It might be introduced through the supply passage set in some other position than that illustrated. It is only necessary that the liquid passing into the chamber be injected so as to strike the cylindrical wall in the same way and to give the same direction of swirl as that issuing from the upper ends of the tubular passages. This intake pipe F has a regulating valve 75 therein. The upper end of the pipe is secured to the cylindrical wall of the chamber E, well toward one end of the same, as shown.

Obviously, the liquid delivered by the supply pipe F, set as shown, will rotate within the chamber E throughout the greater portion of its circumference before encountering the funnel-shaped outlet 62 through which the greater portion of it passes into the downcomer 59 and is delivered to the first section 36 of the intake manifold D. After being heated in the first section of pipes, it is discharged therefrom into the outlet manifold E, and after again making repeated circuits of the circumference, during which still more of the heated vapors are carried off, it passes through openings in the barrier K into the second section and its downcomer 60 and is delivered to the second section 37 of the intake manifold D, where it is fed into the second section of heating pipes. A like operation occurs for the third section, the third downcomer 61 and section 38 playing their part. All of this operation will be explained more fully hereinafter.

At this point, it may be noted that the stream which is sucked through the passage H into the lower portion 106 of the chamber B comprises the heavier concentrates and lighter gases and vapors. The heavier concentrates flow over the lower portion of the passage while the lighter substances are more elevated. As the stream enters the chamber B it necessarily expands somewhat due to the larger capacity of the chamber. It also enters the chamber with a swirling motion. This motion tends to separate the heavier concentrates which are collected in the bottom of the chamber, from the lighter gases and vapors which are drawn upward into the upper portion where they are subjected to the usual jet condenser action.

Where the preliminary rotation is not considered of sufficient importance, the incoming pipe connection F may be replaced by one which connects directly with the lower manifold of the heat exchanger. Then the first movement of the liquid would be up through the first section of heat exchanger pipes and the pipe connection F would be omitted.

Turning to the supply of the heating medium which for the present may be assumed to be steam, it will be noted that the same is supplied to a steam manifold 76. This manifold is formed upon one side of the plate 22 of the tubes 21. As indicated in Fig. 5, the steam manifold 76 is provided with a slot 77. This opening or slot 77 extends completely across the heat exchanger.

A short nipple 80 is connected directly to the manifold 76. In this way, steam is admitted to all the heating tubes 20. These tubes are closed off at their opposite ends, as indicated by scalloped plates 81 and 82. The projecting portions of the plate 71 cover and close the upper ends of the tubes 20 and leave the tubes 21 open for the passage of the liquid. The projecting portions of the plate 82 in like manner close the tubes 20 at their lower ends and leave the tubes 21 open for the passage of the liquid. The steam outlet through which the condensate flows is similarly provided by an outlet manifold 83 having a nipple 84. The manifold 83 similarly extends throughout the width of the heat exchanger, as illustrated more particularly in Fig. 5. There the opening 85 is in the form of a slot extending from one end of the manifold to the other. Thus, steam is admitted and passed through the heating pipes 20 in heat exchange relation to the treating pipes 21.

Figure 2:
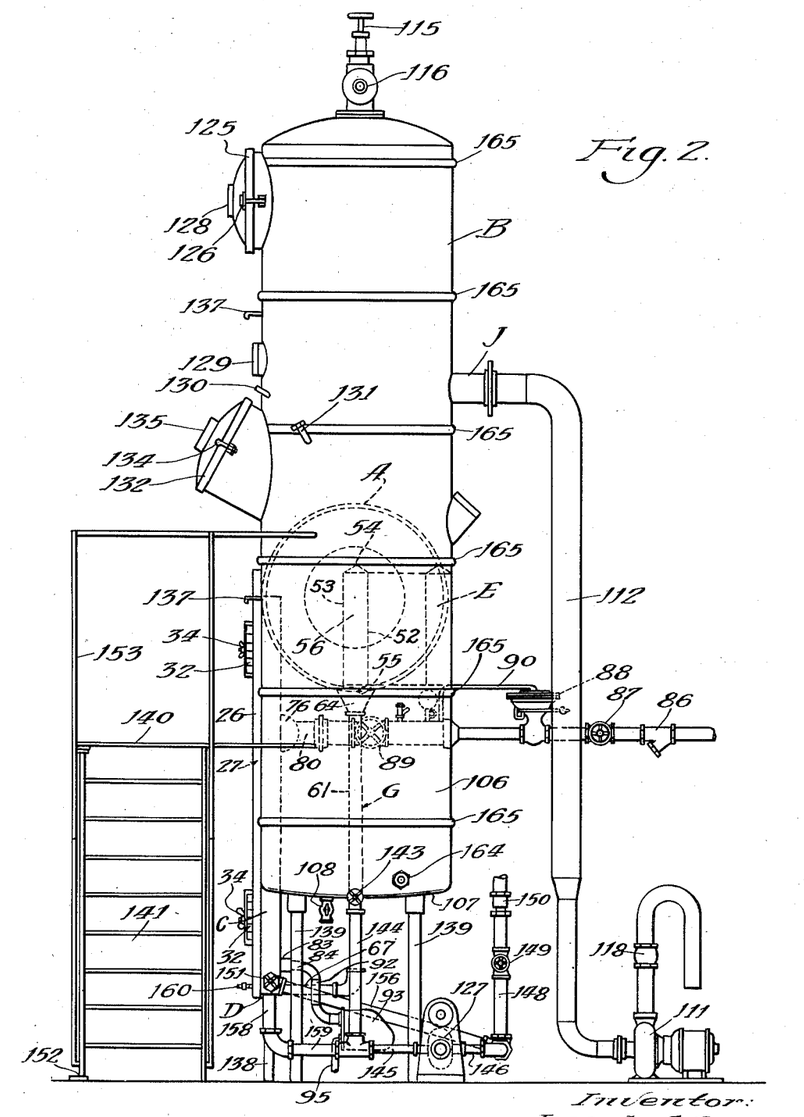
Fig. 2 is a front elevation of the same apparatus.
Figure 3:
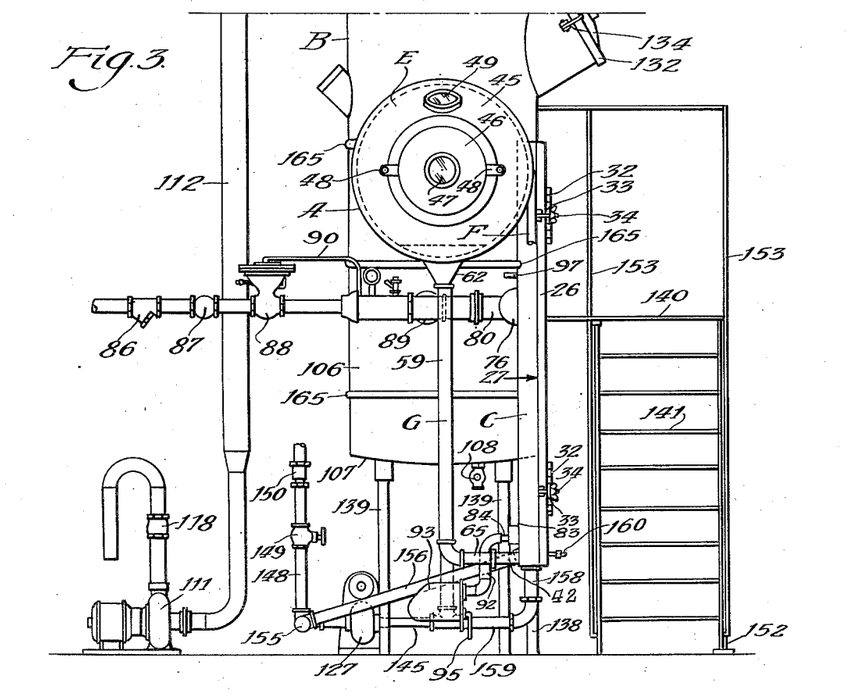
Fig. 3 is a rear view of the lower portion of said apparatus.

The steam on its way to the manifold 76 (see Figs. 2 and 3) passes through a strainer 86, a globe valve 87, a pressure reducer 88, and a throttle valve 89. Similarly, the condensate passing from the exchanger passes by way of outlet 84 and outlet pipe 92 to a steam trap 93, which suitably discharges through a pipe 95 into a sewer connection or directly upon the floor, as shown. The usual steam connection with the pressure reducer 88 is provided by the small pipe 90.

It will be noted that the upper portions of the tubes, which are adapted to contain the heat exchange medium, are connected to a vent manifold 96. A vent pipe 97 connects this manifold directly to the atmosphere at a point considerably below the vent manifold. This vent serves to carry off air, non-condensible gases and the like. The manifold 96 and vent pipe 97 are shown more particularly in Figs. 5 and 6.

Figure 9:
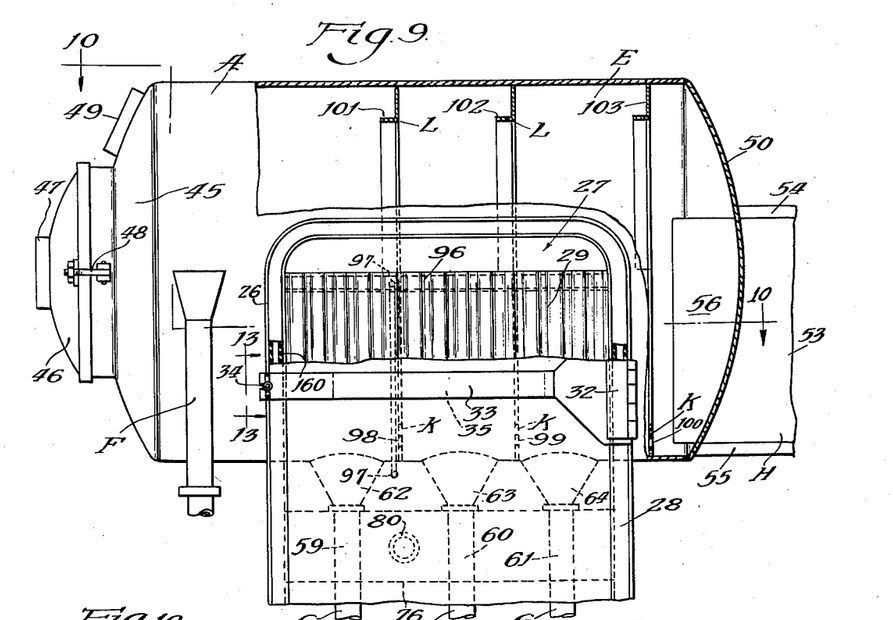
Fig. 9 is an elevation of the upper chamber or manifold connected with the heating element, a portion of the same being shown in vertical section taken on a plane indicated by the line 9—9 of Fig. 10.
Figure 10:
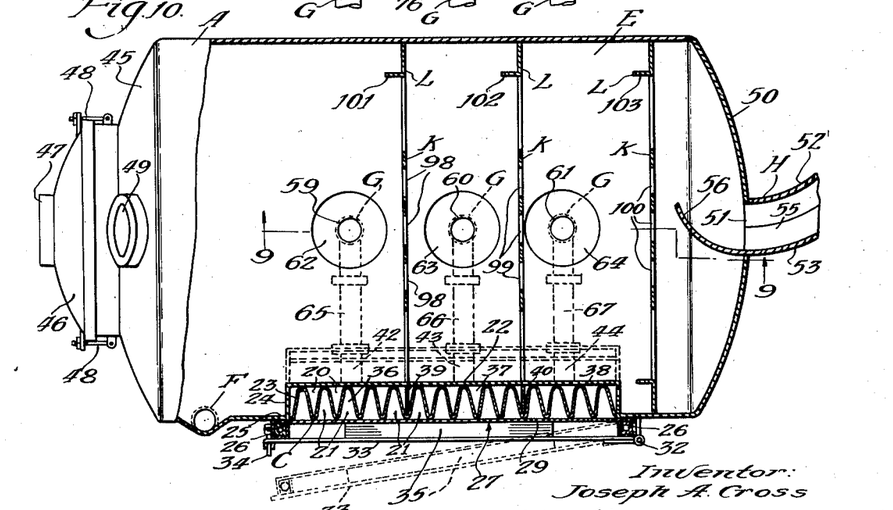
Fig. 10 is a horizontal view showing the greater portion of the upper manifold in section, the plane of section being indicated by the line 10—10 of Fig. 9, and also the barriers in the bottom of said manifold being broken away to clearly show the openings therethrough.
Figures 11, 12, 13, 14:
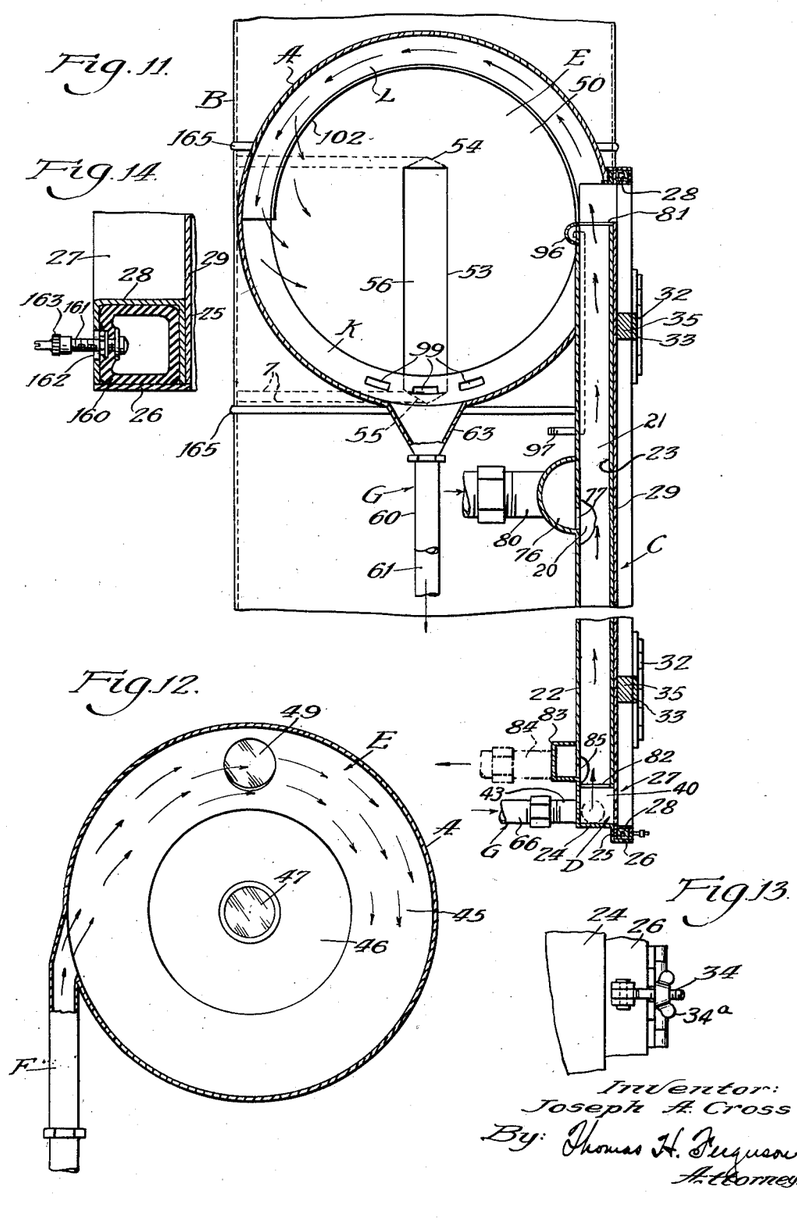
Fig. 11 is a transverse section of the heat exchanger taken in part on the plane indicated by the line 11—11 of Fig. 1.
Fig. 12 is a similar section viewed in the opposite direction to Fig. 11, taken on a plane indicated by the line 12—12 of Fig. 1.
Fig. 13 is a detail view of the clamping arrangement for holding the closure in place, the direction of the view being indicated by the line 13—13 of Fig. 9 and accompanying arrows.
Fig. 14 is a detail view of the lower edge of the closure and its expansible gasket showing the valve stem, the plane of section being indicated by the line 14—14 of Fig. 1.

The interior of the outlet manifold chamber E is divided into three units or sections by the partitions K (see Figs. 9, 10 and 11). These partitions extend preferably throughout one-half of the circumference of the chamber and are associater respectively with the deflectors L. The partitions or barriers K are provided with a number of transverse openings 98, 99, 100, there being preferably three employed in the equipment shown. Likewise, the deflectors L are provided with transverse flanges 101, 102, 103. The action of these perforated barriers and the flanged deflectors is to keep the heavier ingredients near the periphery of the chamber and in the sections to which they belong, as they rotate and are acted upon by the vacuum of the condensing and separating chamber B. It will be seen that as the liquid is forced upward and around, the heavier particles will tend to cling to the circular wall of the chamber E more tenaciously than the vapor particles which are carried away by the suction constantly applied. Thus the concentrate is held by the barriers K and slowed down in its travel toward the outflow passage H, finally reaching the bottom of the chamber B where it is collected and withdrawn.

Thus, in operation, the liquid which passes into the intake manifold D (for details see Figs. 6 and 11), flows upward through the treating tubes 21 and out into the outlet manifold E. The steam flows downward and upward into and through the heating tubes 20, passing inward at the manifold 76 while the condensate is discharged at the heating medium outlet manifold 83.

The barriers K (for details see Figs. 9, 10, and 11) retard the flow of the concentrates. The first two retard its flow into the downcomers 60 and 61, respectively, and the third into the final outflow passage H. Of the three barriers K, two are in alignment with the partitions 39 and 40 respectively, and the third being at the far side of the heat exchanger from the supply passage F, and adjacent to the outflow passage H, effectively retards the flow of the liquid being treated. The deflectors L in the top of the manifold E are three in number arranged in line with the barriers K.

Thus, to present the steps of the operation more in detail, the fresh or raw liquid to be treated is continuously supplied through the supply pipe F (see Fig. 12) into the first section of the horizontal outlet chamber or manifold E and is directed by the curved wall thereof (see Fig. 11) in the same direction as the heated vapor and liquid emerging from the treating tubes 21 into the same chamber. Liquid passing down by gravity through the first downcomer 59 into the first intake chamber 36 (see Fig. 5) of the intake manifold D obtains access to the first section of treating tubes 21 (see Fig. 10) and is rapidly heated through the associated heating tubes 20 of the first unit. The heated liquid is forced upward through the tubes 21 by the applied heat and emerges from their upper ends in a violent centrifugal swirl within the first section of the outlet chamber E. This swirling mass emerges as hot vapor and more or less concentrated liquid. As it swirls around, the vapor passes out and more or less concentrated liquid passes down through the same downcomer 59 and is recirculated. In the recirculation of this first unit, the downcomer 59, the intake chamber 36, the first section of treating tubes 21, and the first section of the outlet chamber E constitute the recirculating or cyclic path of the first effect or unit. As the liquid travels over this circuitous path, it is kept more or less within the limits of the first unit of the outlet manifold E by the deflector L and barrier K of the first section, namely, those having the flange 101 and the apertures 98 (see Fig. 10). The heavier concentrate and the lighter vapor are thus separated, the vapor responding to the drawing force of the vacuum which sucks the vapor out through the circular orifice or opening provided by the meeting deflector L of the first section (having the flange 101) and the aligned barrier K (having the openings 98). The vapor ultimately passes out through duct H. The meeting deflector L and barrier K, in addition to forming the orifice, provide a marginal wall which holds the more or less concentrated liquid which travels near the periphery of the chamber E, as the mass swirls under centrifugal force. Thus the particular deflector L and barrier K constitute partition means near the outgoing end of the first unit for baffling the entrainment of droplets of the liquid along with the vapor. This particular deflector L and barrier K serve to guide the partially concentrated liquid within the first unit. This liquid, including the centrifugally separated droplets, is thus guided down to the downcomer pipe 59 and the other elements of the recirculating path and is given a number of recirculations according to the relation between quantity of liquid supplied and the quantity of partially concentrated liquid withdrawn. Ordinarily, the quantity of the partially concentrated liquid withdrawn is but a small fraction of the total amount of liquid being recirculated. The point at which this withdrawal takes place is in the lower portion of the outlet chamber E where the three openings 98 (see Figs. 9, 10 and 11) are located. These openings 98 form the passageway into the next evaporator unit.

Upon entering the second unit of the manifold E, namely, that bounded on both sides by the deflectors L and barriers K (the deflectors having the flanges 101 and 102 and the barriers having the openings 98 and 99) (see Figs. 9 and 10), the partially concentrated liquid is subjected to further evaporation, but this time it has a higher starting temperature. It is thus further concentrated. Here the cyclic path includes the second downcomer 60, the intake chamber 37, the second group of liquid treating tubes 21 (see Fig. 5), and the central unit of the outlet chamber E. The partially concentrated liquid travels over this circuitous path a number of times and continuously discharges its further concentrated product through openings 99 of its barrier K.

In the third unit, the operation is again repeated, this time starting with a still more concentrated liquid. The downcomer 61, the section or chamber 38 of the intake manifold D, the third group associated treating tubes 21 of the element C, the deflector L having the flange 103, and the barrier K having the openings 100 here all come into play in a similar manner. The vapor is again discharged. The liquid in practically its final state of concentration is delivered to the discharge duct H and by it to the chamber B. If it should require further treatment because the degree of concentration is insufficient, the liquid may be again passed through the third evaporating section, as will be explained hereinafter when considering the piping.

The upright cylindrical chamber B (see Figs. 1 and 2) has an upper portion and a lower portion. The lower portion 106 serves as a collecting portion for the concentrate. The bottom 107 of the chamber is inclined downwardly to a low point at its front. There a striking cup valve 108 is located. When a sample of the condensate is to be withdrawn, a cup is pressed upward against a suitably gasketed plate on the lower end of the valve. This makes a tight connection between the two. Then by turning the valve to open position, the cup is filled, or partially filled, as desired. Then the valve is shut off and the filled or partially filled cup removed. The contents may then be tested for viscosity or otherwise, as may be desired. For the purpose of inspecting the concentrate within the lower portion 106 of the chamber B, the latter is provided with peepholes 109 and 110.

The vapor is drawn into the chamber B by the vacuum pump 111, connected through pipe 112 with the vacuum outlet J. A check valve 118 on the outgoing side of the pump assists in maintaining the vacuum. As the heated vapor is drawn into the chamber B, it is cooled and condensed by coming into contact with a supply of cold water coming through pipe 113 into a suitable spray device 114, which is sprayed about within the chamber B. The spray device 114 is suitably adjusted by a hand-wheel 115. The non-condensible gases and the like pass out through pipe connection 116. As the spray occurs in the upper portion of the chamber B, it encounters the gases which pass upward within the chamber. The water travels downward in the form of streams or sheets and has a divergent course by reason of the outwardly extending baffles 117 with intervening inwardly extending baffles 119. In this way the gases and vapors are thoroughly mixed within the upper portion of the chamber and the water is drawn off through the pump connection J. It will be noted that the interior of the horizontal chamber E is subjected to the exhausting effect of the suction means, as well as the interior of the main chamber B. In fact, the chamber B constitutes a vacuum chamber which is connected to the discharge passage extending from the horizontal chamber E and serves to withdraw the partially treated fluid therefrom and further treat the same by subjecting it to the condensing operation which takes place in the top of the chamber B. The canopy 123 located at the upper end of the tube 120 is held in place by a plurality of supports 121 suitably welded to the canopy and the tube. The water travels down and collects in the trough 122 surrounding the tube and is then drawn off by the vacuum pipe J which is located at that level. On the other hand, the vapors pass out through the upper end of the pipe or tube 120 and then are directed downward to the vicinity of the trough 122 where they again rise in contact with the baffles 117 and 119, and so pass out through the connection 116 provided for their escape.

For the purpose of inspection, the upper end of the chamber B is provided with a light opening 124 into which a lamp fixture may be passed and properly secured. Likewise, the wall of the chamber adjacent to this point is provided with a manhole 125 which may be secured in place by swing bolts 126 provided with securing nuts, as is common practice. The manhole cover is provided with a peephole 128 through which the interior may be viewed. A second peephole 129 is provided at a point opposite the outlet J. A coupling 130 is provided for a water thermometer. A similar connection 131 is provided for the purpose of breaking the vacuum within the chamber B. A further manhole 132 is located just below the connection J and is inclined, as shown, so as to provide for access to the interior of the chamber. The cover of this manhole may be secured in place as before by suitable swing bolts 134 having thumb nuts. The center of the manhole cover is provided with a peephole 135 through which the interior may be inspected. A coupling for a vacuum gauge is provided at 136, also steps 137 by which an attendant may climb up on the chamber. A thermometer connection 164 is also provided near the bottom of the chamber B adjacent to its outlet.

The heat exchanger A is suitably mounted upon legs 138, while the upright cylinder B is similarly mounted upon legs 139. A platform 140 extends outward from the side of the upright chamber B and is reached by a flight of stairs 141. The platform 140 is supported by the stairs and a leg 152. A suitable railing 153 is also provided.

Turning now to the piping (see Figs. 1 to 4 inclusive), it will be seen that the concentrates, when having the necessary viscosity (degree of concentration), are withdrawn from the bottom of the chamber B through a valve controlled outlet 142. The valve 143 controls this outlet which extends through pipe 144 and pipe 145 to the intake side of the pump 127. From the outlet or delivery side of the same pump, the connection is continued through pipes 146 and 147 to the riser 148; and from this point on to any suitable collecting device. The continuity of operation of the pipe 148 is controlled by a valve 149 and a check valve 150. Continuing on beyond the pipe 147, in line with it, is a pipe 154 which is controlled by a valve 155. The pipe 154 is connected by an inclined pipe 156 with the third or last section 38 of the heat exchanger. This pipe 156 thus constitutes a valve controlled passage between the lower manifold D and the delivery side of the pump 127. The valve 155, when closed, prevents any flow through the pipe 156. An additional path from the lower manifold D to the intake side of the pump 127 includes pipes 157, 158 and 159. This additional path has its continuity controlled by a valve 151. With valves 151 and 155 closed, the concentrate travels over a path extending from chamber B through elements 142, 143, 144, 145, 127, 146, 147, 148, 149 and 150 to the point of discharge. The check valve 150 serves to retain the head upon the pump 127 and so maintains the vacuum.

When, in the operation of the system (see Figs. 1 to 4 inclusive), the concentrate shows insufficient viscosity, that is to say, insufficient concentration, it becomes necessary to recirculate it. Accordingly, by closing valves 151 and 149 and opening valves 143 and 155, it is possible to circulate the substance over a path which may be traced from the chamber B down through pipes 142, 144, 145, pump 127, pipes 146, 147, 154, 156, back to the third section 38 of the exchange heater, namely, through connection 41, whereupon it will rise in the heater and pass out at the upper end and proceed, as previously, back to the lower portion 106 of the chamber B. By maintaining this circuit, it is possible to recirculate the liquid until it reaches the required viscosity or degree of concentration as determined by tests.

If this is the end of the run, then the system must be drained, and to do this it is necessary to close valve 155 and open valves 143, 149 and 151. Thereupon an open pipe connection is provided between the inlet manifold D of the heat exchanger to the pump 127 by way of pipes 157, 158 and 159. Thus, a valve controlled passage is provided from the lower manifold D to the intake side of the pump 127. Then the whole system can be thoroughly drained by the pump 127.

In order to maintain a tight connection between the cover 27 and the fixed element of the heat exchanger, I provide a tubular gasket 160. This takes the form of a pneumatic tube which extends all the way around the cover and lies within the channel 28. In assembling the tube within the channel 28, it is necessary to pass the valve stem 161 through a suitable opening 162 made in a portion of the channel, preferably as shown. When the stem and tube are properly assembled, the tube may be expanded by blowing air into its interior and thus forcing it out into contact with the flange 26 upon the fixed portion of the exchanger. For this purpose, the stem 161 is provided with a valve such as is ordinarily provided for automobile tires and the like. A cap 163 covers the end of the stem 161 and may be screwed into place as shown in Fig. 14. To let air out of the tube 160, it is only necessary to remove the cap 163 and press upon the end of the valve within the stem 161 as is commonly done with automobile and bicycle tires. When the cover 27 is seated and the gaskeet 160 blown up, a tight fit is obtained. On the other hand, the cover 27 is easily removed upon deflating the gasket.

Except where otherwise indicated, the various parts are composed of metal and in places where the liquid to be treated engages the metal, it preferably is composed of stainless steel. Thus, the wavy sheet 23 and the engaging cover 27, which make up the treating tubes 21, is composed of stainless steel. Again, the two pumps, 111 and 127, are preferably centrifugal pumps driven by electric motors. The main body of the upright chamber A may be reinforced by ribs 165 formed by suitably shaping the metal. Other minor changes may be made in the structure herein disclosed without departing from the spirit and scope of the invention. It is intended by the terms of the appended claims to cover all these alterations and modifications.

I claim:

1. An evaporator comprising a group of vertical tubes for carrying a liquid to be treated, means for conducting a heating medium into and out of heat exchange relation with said tubes, an inlet chamber in communication with the lower ends of said tubes, a cylindrical outlet chamber located at the upper ends of said tubes and having a discharge opening at one end and a horizontal axis, said tubes entering tangentially into said outlet chamber to direct the delivery of the heated liquid and vapor arising from the upper ends of said tubes within said chamber into a centrifugal swirl about said axis, a downcomer passage leading from an opening in the bottom of said outlet chamber to said inlet chamber and thence to the lower ends of said tubes, said downcomer passage, inlet chamber, liquid treating tubes and outlet chamber providing a recirculating path, means for continuously supplying fresh liquid to said outlet chamber, flange-like baffling means extending radially inward from the cylindrical wall of said outlet chamber, said baffling means providing a central aperture through which vapor may be withdrawn from said outlet chamber and a marginal wall radially outside of said aperture for holding and guiding the partially concentrated liquid in a peripheral stream to said downcomer passage for recirculation over said recirculating path, and means comprising transverse openings through said baffling member near the bottom of said outlet chamber for continuously forwarding from said outlet chamber a quantity of the partially concentrated liquid constituting a small fraction of the total amount of liquid being recirculated.

2. In a sectional evaporator, the combination of an assembly of coplanar substantially duplicate units each including two sets of upright tubes arranged in heat exchange relation to each other, one set for heating and the other set for treating a liquid, each said set being composed of an intermediate corrugated sheet closed by plain parallel plates on opposite sides of said corrugated sheet, the plate completing the treating tubes being readily removable to facilitate cleaning the treating tubes, said latter plate being common to a plurality of said units, means for conducting a liquid to be treated into and out of said treating tubes, and means for conducting a heating medium into and out of said heating tubes.

3. An evaporator comprising a sheet having vertically extending corrugations, vertical plates on opposite sides of said sheet contacting the ridges of said corrugations, one plate being movably mounted relatively to said sheet to facilitate it being retracted from said sheet to expose for cleaning purposes the corrugation channels facing said movable plate, inlet and outlet means aligned respectively below and above and opening into the ends of said channels for effecting simultaneous unidirectional flow through the entire length of said channels of a fluid to be subjected to heat exchange while passing therethrough, and inlet and outlet means for the passage through the corrugation channels facing the other plate of another fluid for heat exchange with the aforesaid fluid.

4. An evaporator comprising a sheet having vertically extending corrugations, vertical plates on opposite sides of said sheet contacting the ridges of said corrugations, one plate being hingedly mounted relatively to said sheet to facilitate it being retracted from said sheet to expose for cleaning purposes the corrugation channels facing said hinged plate, inlet and outlet means aligned respectively below and above and opening into the ends of said channels for effecting simultaneous unidirectional flow through the entire length of said channels of a fluid to be subjected to heat exchange while passing therethrough, and inlet and outlet means for the passage through the corrugation channels facing the other plate of another fluid for heat exchange with the aforesaid fluid.

5. An evaporator comprising a sheet having vertically extending corrugations, vertical plates on opposite sides of said sheet contacting the ridges of said corrugations, one plate being movably mounted relatively to said sheet to facilitate it being retracted from said sheet to expose for cleaning purposes the corrugation channels facing said movable plate, inlet and outlet means for the passage through said channels facing said movable plate of a liquid to be subjected to heat exchange while passing therethrough, inlet and outlet means for the passage through the corrugation channels facing the other plate of heating fluid for heat exchange with the aforesaid liquid, vapor separating means connected separately with the outlet means of separate groups of said first channels, means for returning to the inlet means of each said group the major portion of the unvaporized liquid discharged from each such group into said separating means, means for continuously and progressively forwarding a lesser portion of partially concentrated liquid received from a group carrying liquid of less concentration to a group carrying liquid of greater concentration, means for discharging vapor from the separating means, and means for discharging concentrated liquid from the group carrying liquid of greatest concentration.

6. An evaporator comprising groups of vertical tubes for carrying a liquid to be concentrated, means for supplying a heating medium for heating said tubes, a cylindrical vapor separator having a horizontal axis and so positioned and connected with said groups of tubes to receive tangentially thereinto from the outlet ends of said tubes heated liquid and vapor flowing therefrom, centrally apertured arcuate baffle means for segregating as separate liquid bodies the liquid discharged from each said group, means for withdrawing vapor through said central apertures and from the separator, means for returning from the separator to each group for recirculation therethrough the major portion of the liquid discharged from the same group, means for continuously and progressively forwarding a lesser portion of partially concentrated liquid received from a group carrying liquid of less concentration to a group carrying liquid of greater concentration, and means for discharging concentrated liquid from the group carrying liquid of greatest concentration.

7. An evaporator comprising groups of vertical tubes for carrying a liquid to be concentrated, means for supplying a heating medium for heating said tubes, a cylindrical vapor separator having a horizontal axis and so positioned and connected with said groups of tubes to receive tangentially thereinto from the upper ends of said tubes heated liquid and vapor flowing therefrom, centrally apertured arcuate baffle means for segregating as separate liquid bodies the liquid discharged from each said group, means for withdrawing vapor through said central apertures and from the separator, means for returning from the separator to each group for recirculation therethrough the major portion of the liquid discharged from the same group, means for continuously and progressively forwarding a lesser portion of partially concentrated liquid received from a group carrying liquid of less concentration to a group carrying liquid of greater concentration, and means for discharging concentrated liquid from the group carrying liquid of greatest concentration.

JOSEPH A. CROSS.

REFERENCES CITED

The following references are of record in the file of this patent:

UNITED STATES PATENTS

| Number | Name | Date |
|---|---|---|
| 447,123 | Theiser | Feb. 24, 1891 |
| 482,340 | Cooper | Sept. 13, 1892 |
| 521,946 | Cooper | June 26, 1894 |
| 548,986 | Hewitt | Oct. 29, 1895 |
| 965,388 | Kestner | July 26, 1910 |
| 1,028,737 | Kestner | June 4, 1912 |
| 1,028,738 | Kestner | June 4, 1912 |
| 1,828,477 | Seligman | Oct. 20, 1931 |
| 1,883,379 | Kermer | Oct. 18, 1932 |
| 1,943,106 | Burnham | Jan. 9, 1934 |
| 1,966,181 | Lowry | July 10, 1934 |
| 2,147,993 | Schiebe | Feb. 21, 1939 |
| 2,150,860 | Hughes | Mar. 14, 1939 |
| 2,277,651 | Steele | Mar. 24, 1942 |

FOREIGN PATENTS

| Number | Country | Date |
|---|---|---|
| 320,279 | Great Britain | Oct. 10, 1929 |